(12) United States Patent
Mohajer et al.

(10) Patent No.: US 9,035,163 B1
(45) Date of Patent: May 19, 2015

(54) SYSTEM AND METHOD FOR TARGETING CONTENT BASED ON IDENTIFIED AUDIO AND MULTIMEDIA

(75) Inventors: Keyvan Mohajer, Los Gatos, CA (US); Aaron Master, Palo Alto, CA (US)

(73) Assignee: Soundbound, Inc., Santa Clara, CA (US)

( * ) Notice: Subject to any disclaimer, the term of this patent is extended or adjusted under 35 U.S.C. 154(b) by 337 days.

(21) Appl. No.: 13/468,975

(22) Filed: May 10, 2012

Related U.S. Application Data

(60) Provisional application No. 61/484,609, filed on May 10, 2011.

(51) Int. Cl.
*G10H 1/00* (2006.01)
*G10H 1/18* (2006.01)
*G10H 7/00* (2006.01)
*G10L 15/00* (2013.01)

(52) U.S. Cl.
CPC ..................... *G10L 15/00* (2013.01)

(58) Field of Classification Search
CPC ................................. G06F 17/30758
USPC ..................................................... 84/615, 653
See application file for complete search history.

(56) References Cited

U.S. PATENT DOCUMENTS

| | | | |
|---|---|---|---|
| 7,490,107 B2 * | 2/2009 | Kashino et al. | 1/1 |
| 2001/0049664 A1 * | 12/2001 | Kashino et al. | 705/52 |
| 2007/0282860 A1 * | 12/2007 | Athineos et al. | 707/10 |
| 2009/0063277 A1 * | 3/2009 | Bernosky et al. | 705/14 |
| 2009/0144273 A1 * | 6/2009 | Kappos | 707/5 |
| 2012/0029670 A1 | 2/2012 | Mont-Reynaud et al. | |
| 2012/0036156 A1 | 2/2012 | Mohajer et al. | |
| 2012/0143679 A1 * | 6/2012 | Bernosky et al. | 705/14.46 |

* cited by examiner

*Primary Examiner* — Jeffrey Donels
(74) *Attorney, Agent, or Firm* — Haynes Beffel & Wolfield LLP; Ernest J. Beffel, Jr.

(57) ABSTRACT

The present disclosure relates to systems and methods that recognize audio queries and select related information to return in response to recognition of the audio queries. The technology disclosed facilitates easy designation of aggregate user experience categories and custom audio references to be recognized. It facilitates linking and return of selected information in response to recognition of audio queries that match the designated aggregate user experience categories or custom audio references to be recognized.

21 Claims, 5 Drawing Sheets

127

Distribution Server

Recognition Module 311

Categorization Module 321

Prioritization Module 331

Download Module 341

Computing Device App

Local Recognition Module 411

Local Categorization Module 421

Local Content Selection Module 431

Content Display Module 441

Fig. 4

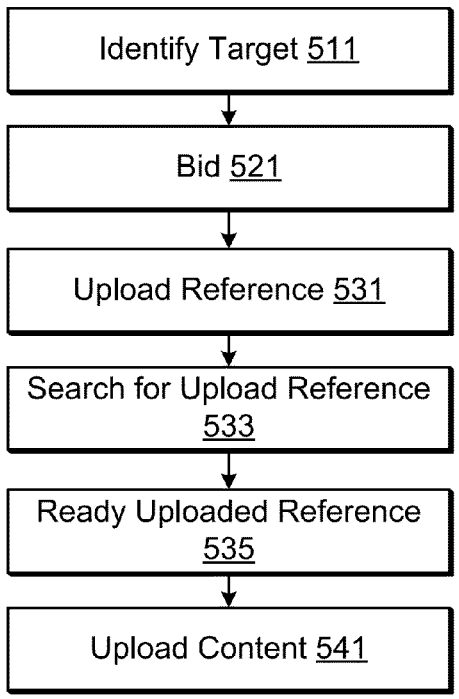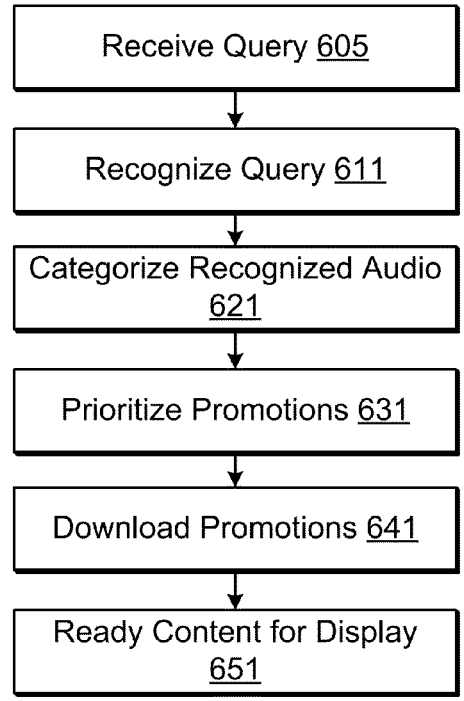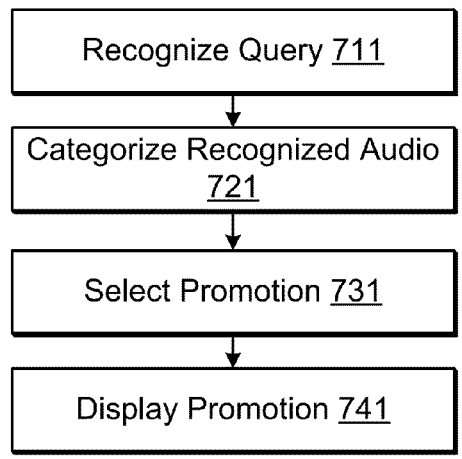

SYSTEM AND METHOD FOR TARGETING CONTENT BASED ON IDENTIFIED AUDIO AND MULTIMEDIA

RELATED APPLICATION

This application is related to and claims the benefit of U.S. Provisional Patent Application No. 61/484,609, entitled "System and Method for Targeting Content Based on Identified Audio and Multimedia," by Aaron Master and Keyvan Mohajer, filed May 10, 2011. The priority application is incorporated herein by reference.

BACKGROUND

The present disclosure relates to systems and methods that recognize audio queries and select related information to return in response to recognition of the audio queries. The technology disclosed facilitates easy designation of aggregate user experience categories and custom audio references to be recognized. It facilitates linking and return of selected information in response to recognition of audio queries that match the designated aggregate user experience categories or custom audio references to be recognized.

Song recognition is related to humming and voice recognition. Algorithms have been developed that allocate audio processing steps between a hand-held device and a remote server. The team working on the technology disclosed in this application has contributed to this art, including development of technology described in US 2012/0036156 A1, published Feb. 9, 2012, entitled "System and Method for Storing and Retrieving Non-Text-Based Information;" and US 2012/0029670 A1, published Feb. 2, 2012, entitled "System and Methods for Continuous Audio Matching." These patent publications are hereby incorporated herein by reference. In some technologies, audio samples are relayed from a hand-held device to a server for processing. In others, features are extracted from the audio for processing. Sometimes, the features are processed locally. Other times, the features are processed by a server. Traditionally, recognition technology has been used only on demand with hand-held devices, due to battery, bandwidth and transmission cost considerations. New technology described by this development team has opened the door to continuous audio recognition using a battery-powered hand-held device, such as a smartphone, tablet or laptop.

Song recognition has been used as a trigger for metadata presentation. The technology disclosed explores other connections that can be made to provide information to a user following recognition of a song or, more generally, of an audio or multimedia segment.

SUMMARY

The present disclosure relates to systems and methods that recognize audio queries and select related information to return in response to recognition of the audio queries. The technology disclosed facilitates easy designation of aggregate user experience categories and custom audio references to be recognized. It facilitates linking and return of selected information in response to recognition of audio queries that match the designated aggregate user experience categories or custom audio references to be recognized. Particular aspects of the technology disclosed are described in the claims, specification and drawings.

BRIEF DESCRIPTION OF THE DRAWINGS

FIG. 3 is a block diagram illustrating example modules within the distribution server.

FIG. 4 is a block diagram illustrating example modules within the computing device app or application.

FIG. 5 is a flow chart illustrating an example process for self-service campaign configuration.

FIG. 6 is a flow chart illustrating an example process for server-based recognition.

FIG. 7 is a flow chart illustrating an example process for local recognition.

DETAILED DESCRIPTION

The following detailed description is made with reference to the figures. Preferred embodiments are described to illustrate the technology disclosed, not to limit its scope, which is defined by the claims. Those of ordinary skill in the art will recognize a variety of equivalent variations on the description that follows.

The technology disclosed provides a variety of examples of relating special recognition of audio to delivery of promotional content. The examples can be extended from audio recognition to image recognition, such as recognizing segments of a movie or television show. The following list of applications of the technology disclosed is not intended to define or limit the claims, which speak for themselves.

The technology disclosed can be applied to a variety of technical problems. Applying some implementations of the technology described, the problem of enabling campaign managers to deliver promotional content based on non-textual user experiences can be solved by a self-service, bid-based system that uses audio recognition of aggregate experience categories as a signal to target delivery of promotional content to hand-held devices for successful bidders.

Applying some implementations of the technology described, the problem of delivering promotional content based on non-textual user experiences can be solved by recognizing audio and categorizing it into an aggregate experience category, then combining the aggregate experience category with priority information derived from bidding for content delivery to select among promotional content to be delivered to a user experiencing the recognized audio.

Applying some implementations of the technology described, the problem of enabling campaign managers to deliver promotional content based on non-textual user experiences can be solved by a self-service, bid-based system that uses audio recognition of aggregate experience categories as a signal to target delivery of promotional content to hand-held devices for successful bidders.

Applying some implementations of the technology described, the problem of receiving useful content based on non-textual user experiences can be solved by sending features of audio and geo-location information to a server and receiving responsive content based on an aggregate experience category to which the audio features belong, localized to a location of a user experiencing the audio using the geo-location information.

Applying some implementations of the technology described, the problem of enabling campaign managers to deliver promotional content based on non-textual user experiences can be solved by a self-service, bid-based system that uses audio recognition of uploaded audio content or features of audio content as a signal to target delivery of promotional content to hand-held devices for successful bidders.

Figure 1:
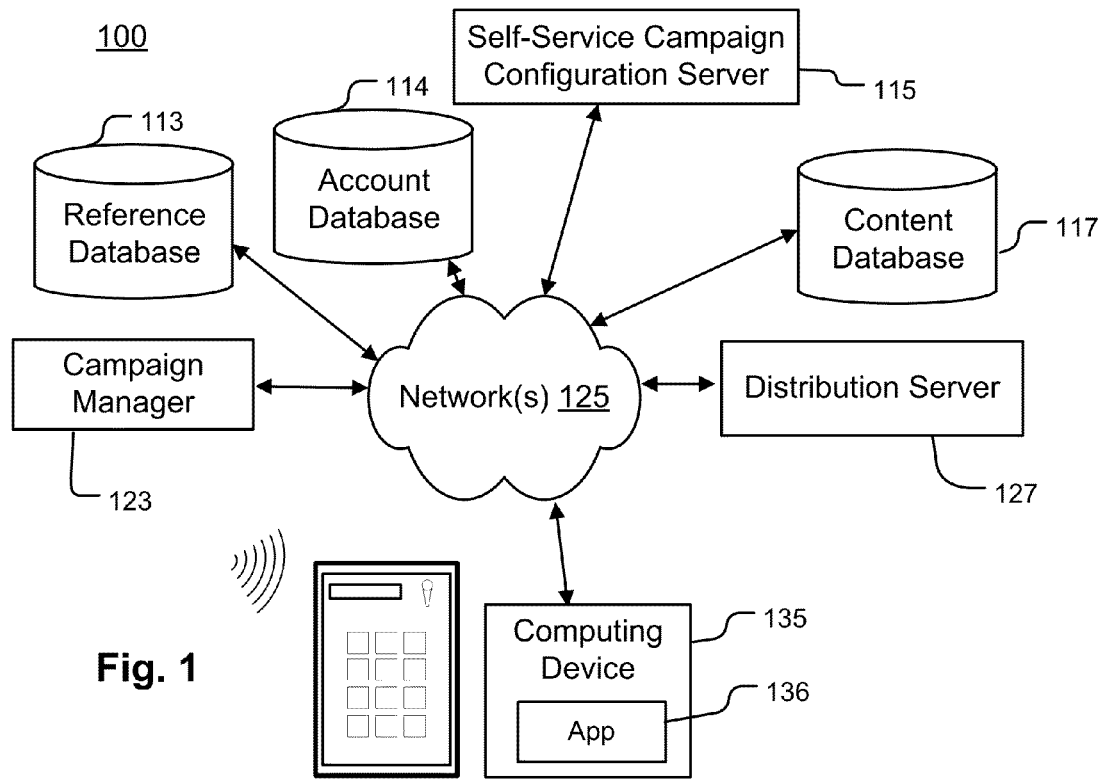
FIG. 1 is an example system that uses audio recognition and classification of recognized content to deliver promotional content.

FIG. 1 is an example system 100 that uses audio recognition and classification of recognized content to deliver promotional content. One classification method includes classifying songs by aggregate experience category. Examples of aggregate experience categories are artist, album, versions of the song, similar artists, recommended songs in a cluster, or tagging patterns. This classification generalizes from a single recognized performance of a song to more relevant bodies of work that can, as a group, be used as a signal for promotional content targeting. Another classification includes recognizing and classifying custom audio references that would not be found in a database of songs. For instance, commercial voiceovers and sound effects or movie dialogues are custom audio references that would not be found in a music recognition database. Of course, the technology disclosed also could be applied to recognition of individual songs and delivery of promotional content responsive to the recognition.

A campaign manager 123 refers to a device that interacts through the network(s) 125 with the self-service campaign configuration server 115. The campaign manager 123 may be a computer, workstation, tablet, laptop, smartphone, consumer appliance or other device running an application or browser. Either a local or remotely based interface, such as a web-based interface, allows the campaign manager 123 to select among options for configuring a campaign. The campaign may be a promotional campaign or an informational campaign. It can promote or inform about a product, candidate, cause, referendum or other messaging interest. The options are further described below.

The campaign manager 123 may be provided access through the network(s) 125 to a reference database 113 that includes audio content references and metadata. The metadata may organize the audio content by aggregate experience categories. Metadata also may organize any custom audio references uploaded by the campaign manager 123.

The self-service campaign configuration server 115 receives choices that a user or an automated system makes and relays to the server using the campaign manager 123 or another device. The self-service campaign configuration server 115 communicates over one or more networks 125 with an account database 114 that maintains account information regarding a reference database 113 that contains audio content references that the overall system 100 matches to captured audio. It also communicates over the network(s) 125 with a content database 117 that contains information, messages, ads and the like that can be presented to a user of a computing device 135 following an audio recognition.

Figure 2:
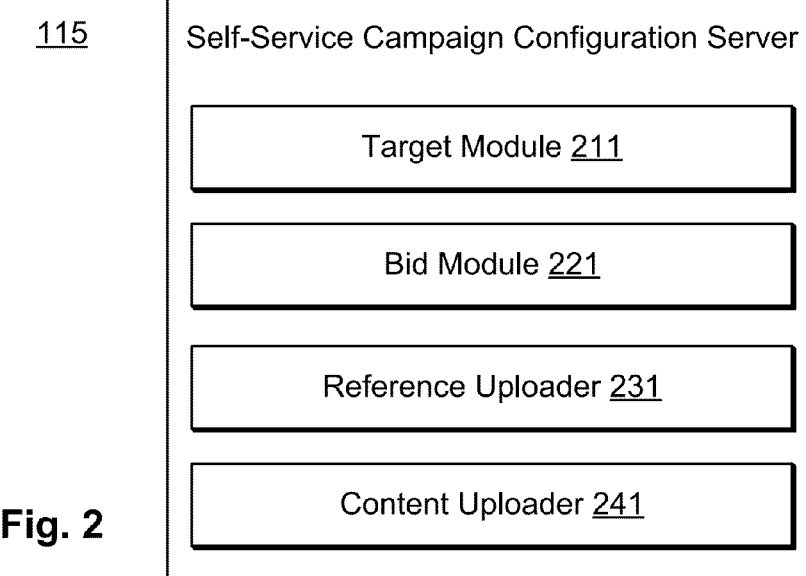
FIG. 2 is a block diagram illustrating example modules within the self-service campaign configuration server.

FIG. 2 is a block diagram illustrating example modules within the self-service campaign configuration server 115. While this server is referred to as "self-service," in some implementations human assistance is available, either immediately or on request, as by initiation of an online chat or call back. In this example, the configuration server includes one or more of a target module 211, bid module 221, reference uploader 231 and content uploader 241. Some implementations may have different and/or additional modules than those shown in FIG. 2. Moreover, the functionalities can be distributed among the modules in a different manner than described herein.

The self-service campaign configuration server 115 recognizes accounts of campaign manager 123 users, stored in the account database 114. Accounts contain contact and billing information for a network information provider. In addition, each account contains at least one campaign with one or more references to targeted multimedia such as an audio fingerprint, a group of multimedia such as the genre of songs or all songs by a particular artist or the textual content of the audio file. Targeted audio or multimedia can be selected from or added to the reference database 113.

The target module 211 accepts parameters for information, message and ad delivery. A campaign manager user may add, delete, or modify the parameters of each campaign after logging into his or her account via an authentication process. The network information provider can select the type of multimedia from an existing database such as a particular song, all songs by an artist or all songs in a given set of genres. Alternatively, the network information provider may upload or provide a link to a new multimedia item, such as an audio file to the database. Other types of multimedia may also be selected or uploaded, such as images, melodies, or videos. The network information provider may also provide the content of the multimedia, such as the corresponding text or melody.

Options for selecting an aggregate user experience category include an artist (all songs by this artist), an album (all songs on this album), all versions of this song by this artist, all versions of this song by other artists, all versions of this song by any artist, all songs by "similar artists," all "recommended songs" based on this artist, and all songs tagged by at least N people that tagged this song. The N people may be from a general population or from a population restricted to friends, contacts, followers of the campaign or the sponsor of the campaign. Options also include genres such as news shows, TV news shows, comedy, drama or science fiction TV shows. An aggregate user experience category is more than just a single song.

Another option for selecting an aggregate user experience category is by identification of a broadcast stream. Technology for identifying a broadcast stream from a query is described in the pending application Ser. No. 13/401,728, filed Feb. 21, 2012, entitled "System and Method for Matching a Query against a Broadcast Stream," which is hereby incorporated herein by reference. This option processes a query to a database compiled in real time that includes broadcast streams, such as radio stations, television stations, Internet radio or TV stations, and live performances. In this example, the aggregate user experience is an ongoing broadcast stream of a performance.

Any of the foregoing options can be modified or restricted by geo-location data, which may reflect either the location where the sound was captured, the location of the sound source or both.

The campaign manager 123 also may select targeting of at least one custom audio, such as an advertisement or informational piece. This audio can be uploaded. If it is uploaded in a video format, the reference uploader 231 can extract the audio portion from multimedia content and perform this additional step for save time and effort for a user of the campaign manager 123. The target module 211 can associate the custom audio target with any of the aggregate user experience categories above. For instance, background music often is combined with an announcer's voice. A custom audio reference allows recognition of this mix of sources and treatment of the custom audio as part of a user experience category. Multiple custom audio targets can be grouped into a campaign. The campaign configuration manager 113 can be configured to request that the campaign configuration server 115 locate and fingerprint particular audio content, such as a commercial broadcast by a competitor. The campaign configuration server or another component cooperating with it can create fingerprints without needing to persist a copy of the target content in storage.

The bid module 221 accepts offers to pay for display of promotional or informational content according to selected triggers. A bidding process occurs when more than one information provider desires to deliver promotional content responsive to targeted multimedia content. The network information provider may enter a bid amount, which may be a money amount, for that particular targeted multimedia. The bid amount can be for display of or clicking through an ad, or both with different values assigned to display and click-through. The system and method of the present invention then compares this bid amount with all other bid amounts for the same targeted multimedia, and generates a rank value for all campaigns with this target. The rank value generated by the bidding process determines which campaign manager user's promotional content is delivered to the device. A higher bid by a network information provider will result in a higher rank. When a targeted multimedia is recognized, either automatically or initiated by a user, the promotional content corresponding to this targeted multimedia from the highest bidding campaign is delivered to the device. A minimum bidding amount can be enforced by the system, which may or may not be visible to the campaign manager user.

In some cases, campaign manager users may want to target their promotional content when the device detects audio multimedia from a competitor. In this case, the information provider can bid on the "fingerprint" of the multimedia if they don't own the rights to the original content.

The reference uploader 231 accepts new audio or multimedia for targeting. Added target segments are analyzed by a processing unit in order to extract features and made searchable by a recognition unit (not explicitly shown). If a custom audio file is uploaded or a link is provided, the system can optionally search the existing database to make sure it is a new unique audio. If a collision takes place, the system can prompt for a higher bid. If the audio matches a song, the system can automatically switch to targeting a reference already in the reference database 113. After references are added to the reference database 113, end users are enabled to use their hand-held device to recognize the referenced audio or multimedia. The informational or promotional materials (such as an advertisement provided by a campaign manager user) can then be delivered along with the search results to recognition users operating hand-held devices and initiating audio queries.

The content uploader 241 accepts information and promotional material to be displayed to recognition users. Uploaded content is persisted to the content database 117. The system 100 delivers promotional content from the original owner and the highest bidders to the device. When the promotional content is delivered, it could be in the form of a banner ad, a half page ad, a full page takeover ad, or a listing. Delivery of the content is influenced by the bid amount. For example, a banner ad can be selected, together with an associated destination URL, to which a user will be directed upon clicking on the banner ad. Banner text and/or image are then uploaded. The preferred text to appear in a history log on a user device can be uploaded with the content. This content is associated with a bid amount per delivery and/or click-through.

The content uploaded can be synchronized with lyrics of the target audio. Synchronization of content to lyrics is described in U.S. patent application. Ser. No. 13/310,630, filed Dec. 2, 2011, entitled "Displaying Text to End Users in Coordination with Audio Playback," which is hereby incorporated herein by reference. In addition to the technology described in that application, more than display of lyrics can be synchronized with song lyrics. For instance, in a music video, the artist could blow a kiss or throw a ball to the audience, and the kiss or ball could end up on the display of the smartphone, tablet or laptop computer.

When the target relates to a competitor, the distribution server can offer a user experiencing the audio query both uploaded content and a link back to the competitor's content. In this way, the user can override the sponsored content and return to the content being experienced. If multiple content alternatives have been uploaded to the distribution server, the server can offer the user links to alternative content, in addition to content selected for display, applying steps described below.

Referring again to FIG. 1, the distribution server 127 is connected via one or more networks 125 to one or more of the reference database 113, account database 114, and content database 117. The distribution server 127 is further connected via the network(s) 125 to one or more computing devices 135 used by end users or recognition users. The distribution server receives a multiplicity of recognition requests from the recognition users.

FIG. 3 is a block diagram illustrating example modules within the distribution server 127. In this example, the distribution server includes one or more of a recognition module 311, categorization module 321, prioritization module 331 and download module 341. Some implementations may have different and/or additional modules than those shown in FIG. 3. Moreover, the functionalities can be distributed among the modules in a different manner than described herein.

The recognition module 311 handles an incoming query and attempts to recognize a reference in the reference database 113 as matching the query. These references can be called audio references to distinguish them from locator references, or can simply be referred to as references. The query includes a sequence of audio samples, a plurality of features extracted from audio samples, a plurality of fingerprints extracted from audio samples, a locator reference to samples, features or fingerprints, or another format of data derived from audio samples of an audio passage to be recognized. The query further may include location data that geographically identifies where the sample was collected or, if remotely collected, where the sample originated. Either the distribution server 127 or the computing device app 136 may timestamp the query. Alternatively, the query may include a locator reference that directs the recognition module 311 to a location where data on which the query is based can be found.

The recognition module 311 can implement any audio recognition technology. Two examples of audio recognition technology previously disclosed by this development team are US 2012/0036156 A1, published Feb. 9, 2012, entitled "System and Method for Storing and Retrieving Non-Text-Based Information" and US 2012/0029670 A1, published Feb. 2, 2012, entitled "System and Methods for Continuous Audio Matching," both of which are incorporated herein by reference. As indicated in FIG. 4 and in the Continuous Audio Matching publication, the recognition module 311 can cooperate with a local recognition module 411 in computing device app 136 on computing device 135. When recognition is accomplished locally on computing device 135, the recognition module 311 on the distribution server 127 may be bypassed and the local recognition accepted.

The categorization module 321 assigns recognized audio to one or more aggregate experience categories, including the categories described above in the discussion of the target module 211. A recognized song, for instance, will be assigned to an artist category, an album category, a versions of this song category, a genre category, and other categories for which targeting is supported. A recognized custom audio will be assigned to categories as selected during interaction with the target module.

The prioritization module 331 prioritizes among campaigns that have bid to provide promotional material in response to the aggregate experience categories that correspond to the recognized audio. This prioritization may be done in advance of recognizing the query and, optionally, transmitted to the computing device app 136 before the query. Either the distribution server 127 or computing device app 136 can select among the prioritized promotional or informational information available to display. The price bid for displaying the information is one factor used in selection. Other factors may include whether the same information recently has been displayed, whether there is a limit on the number of exposures to a particular device that the campaign sponsor will pay for and whether a device user has positively or negatively responded to the same information when previously presented.

The download module 341 provides promotional or information content to the computing device app 136, which can be displayed to a user. This may include content responsive to a particular query, content predicted to be responsive to future queries by the user, or both. Content can be sent for immediate display or to be cached for future display.

FIG. 4 is a block diagram illustrating example modules within the computing device application or app 136 running on a computing device 135, such as a smartphone, tablet or laptop. In this example, the computing device app 136 includes one or more of a local recognition module 411, local categorization module 421, local content selection module 431 and content display module 441. Some implementations may have different and/or additional modules than those shown in FIG. 4. Moreover, the functionalities can be distributed among the modules in a different manner than described herein. A query-forming module (not shown) forms a query as described above for processing by the local recognition module 411 or transmission to distribution server 127.

The local recognition module 411 optionally performs or attempts recognition of a query. This can be done on demand or continuously. On demand local recognition is a local version of the server-based recognition described above, typically with fallback to server-based recognition if local recognition is unsuccessful and the server is available.

The local categorization module 421 is a local version of the server-based categorization described above, typically with fallback to server-based categorization if local categorization is not successful and the server is available.

The local content selection module 431 optionally uses priority information provided by the server to select among promotional or informational messages available for display. The local content selection module 431 controls timing of display. It may limit the number of displays in a time period, such as one display per three minutes. It may limit the frequency with which particular content is repeated, such once per day or five times total. It may combine information about computing device usage that is locally available to select content to display.

The content display module 441 provides content for the computing device 135 to display. This may include adapting content provided by the distribution server 127 to the available display format of the computing device 135.

FIG. 5 is a flow chart illustrating an example process for self-service campaign configuration. Other embodiments may perform the steps in different orders and/or perform different or additional steps than the ones illustrated in FIG. 5. For convenience, FIG. 5 will be described with reference to a system of one or more computers that perform the process. The system can include, for example, the campaign manager 123 and self-service campaign configuration server 115 described above with reference to FIG. 1. The actions described in this system are actions of computer-based systems, some of which can be responsive to human user input. In claims, the steps can be expressed for a system as a whole or from the perspective of one of the system components, such as the campaign manager 123 or the self-service campaign configuration server 115.

At step 511, the campaign manager 123 transmits and the self-service campaign configuration server 115 receives one or more target identifications. The targets identified can be from the reference database 113 or uploaded custom audio or multimedia with audio. The targets can be limited to audio recognitions with a selected country of origin, geographic location, device type, operating system, time of day, user age, user gender or other demographic characteristic.

At step 521, the campaign manager 123 transmits and the self-service campaign configuration server 115 receives one or more bids for delivering promotional or informational content as targeted. Multiple bids may be entered for display in response to recognitions in combination with alternative demographic characteristics. Budgets can be set for an overall campaign or for each bid within a campaign.

At step 531, the campaign manager 123 transmits and the self-service campaign configuration server 115 receives one or more custom audio or multimedia segments to be recognized.

At step 533, self-service campaign configuration server 115 searches the reference database 113 to determine whether the uploaded custom audio or multimedia segments are already available for recognition. Prior availability of custom targeted audio may impact bidding or may cause generation of an alert. An alert may advise the campaign manager 123 that the custom targeted audio already has been uploaded and may identify one or more campaigns in which it already is being used.

At step 535, self-service campaign configuration server 115 readies the uploaded custom audio or multimedia segments for recognition.

At step 541, the campaign manager 123 transmits and the self-service campaign configuration server 115 receives one or more content items for display during the campaign.

FIG. 6 is a flow chart illustrating an example process for server-based recognition. Other embodiments may perform the steps in different orders and/or perform different or additional steps than the ones illustrated in FIG. 6. For convenience, FIG. 6 will be described with reference to a system of one or more computers that perform the process. The system can include, for example, the computing device 135 and distribution server 127 described above with reference to FIG. 1. The actions described in this system are actions of computer-based systems, some of which can be responsive to human user input. In claims, the steps can be expressed for a system as a whole or from the perspective of one of the system components, such as the computing device app 136 or the distribution server 127.

At step 605, the computing device 135 transmits and distribution server 127 receives a query. The query includes data derived from audio capture or a location reference to the derived data. It also may include location information and other information that identifies the computing device 135 or user of the device. If local recognition has been performed by the computing device app 136, the query also may include status information regarding the local recognition.

At step 611, the distribution server 127 recognizes the query.

At step 621, the distribution server 127 categorizes the recognized reference that matches the query. The reference can be assigned to multiple categories of aggregate user experience or custom targeting.

At step 631, the distribution server 127 prioritizes promotional and informational content triggered by the categories that match the query and the custom targets that match the query. This can include assigning value information to content available for display.

At step 641, the distribution server 127 downloads and the computing device 135 receives promotional and informational content.

At step 651, the computing device 135 readies the promotional and informational content for display.

FIG. 7 is a flow chart illustrating an example process for local recognition. Other embodiments may perform the steps in different orders and/or perform different or additional steps than the ones illustrated in FIG. 7. For convenience, FIG. 7 will be described with reference to a system of one or more computers that perform the process. The system can include, for example, the computing device 135 that has interacted with a distribution server 127 in preparation for recognition. The actions described in this system are actions of computer-based systems, some of which can be responsive to human user input. In claims, the steps can be expressed for a system as a whole or from the perspective of one of the system components, such as the computing device app 136 or the distribution server 127.

At step 711, the computing device app 136 recognizes the query.

At step 721, the computing device app 136 categorizes the recognized reference that matches the query. The reference can be assigned to multiple categories of aggregate user experience or custom targeting.

At step 731, the computing device app 136 selects among promotional and informational content triggered by the categories that match the query and the custom targets that match the query. This can include applying a value function and other selection criteria.

At step 741, the computing device app 136 provides the computing device 135 promotional or informational content to display.

FIGS. 8-11 are example graphical interfaces for establishing a campaign to display media on computing device apps. The interface components may collect information in a different order and/or using different or additional interfaces than the ones illustrated in FIGS. 8-11.

Figure 8:
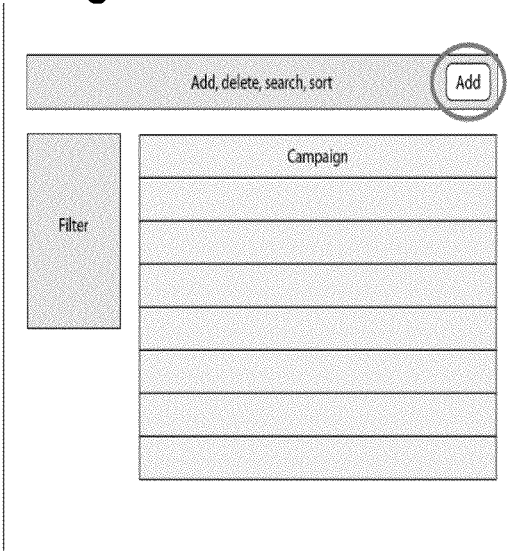
FIG. 8 is an example graphical interface for adding a new campaign to an account.

The interface in FIG. 8 is an example of adding a new campaign to an account. This interface allows adding, deleting, searching and sorting of campaigns in the account. One or more filters can be provided to select campaigns of interest for display. An "add" button can invoke additional interfaces for adding a new campaign.

Figure 9:
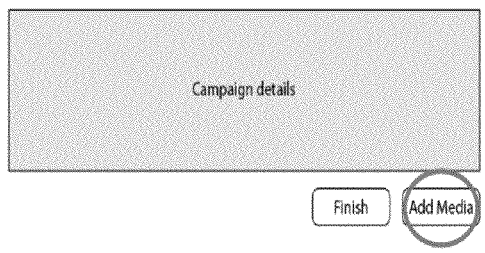
FIG. 9 is an example graphical interface for adding media, such as promotional or informational content, to a campaign.

The interface in FIG. 9 is an example of adding media, such as promotional or informational content, to a campaign. An "add media" button can invoke additional interfaces for adding content.

Figure 10:
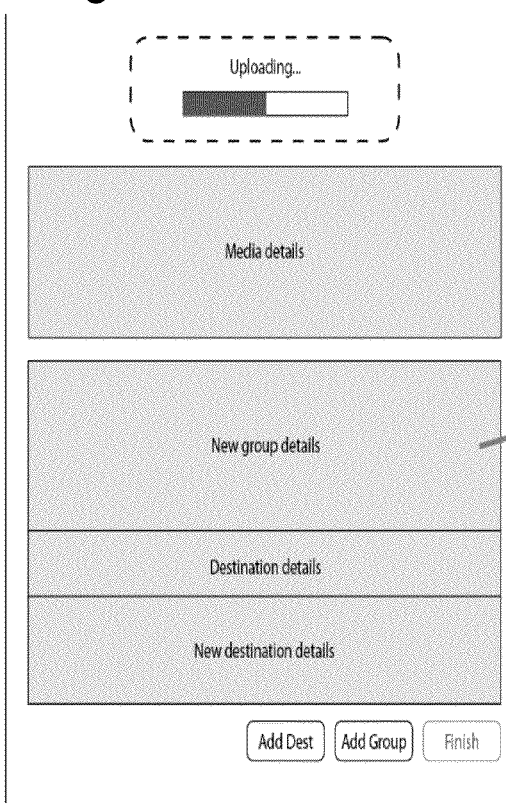
FIG. 10 is an example graphical interface for adding a group that connects target recognition events to media, such as promotional or informational content, in a campaign.
Figure 11:
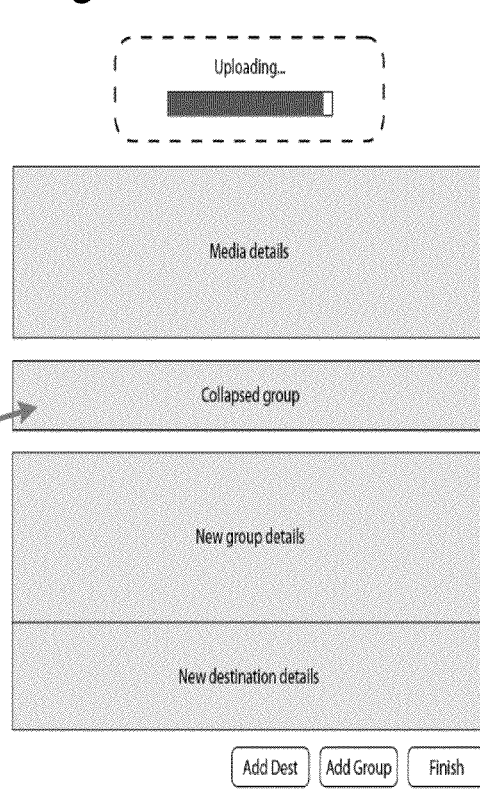
FIG. 11 is an example graphical interface for finishing adding a new group.

The interface in FIG. 10 is an example of adding a group that connects target recognition events to media, such as promotional or informational content, in a campaign. One or more groups are added until, in FIG. 11, "finish" is selected.

Figure 12:
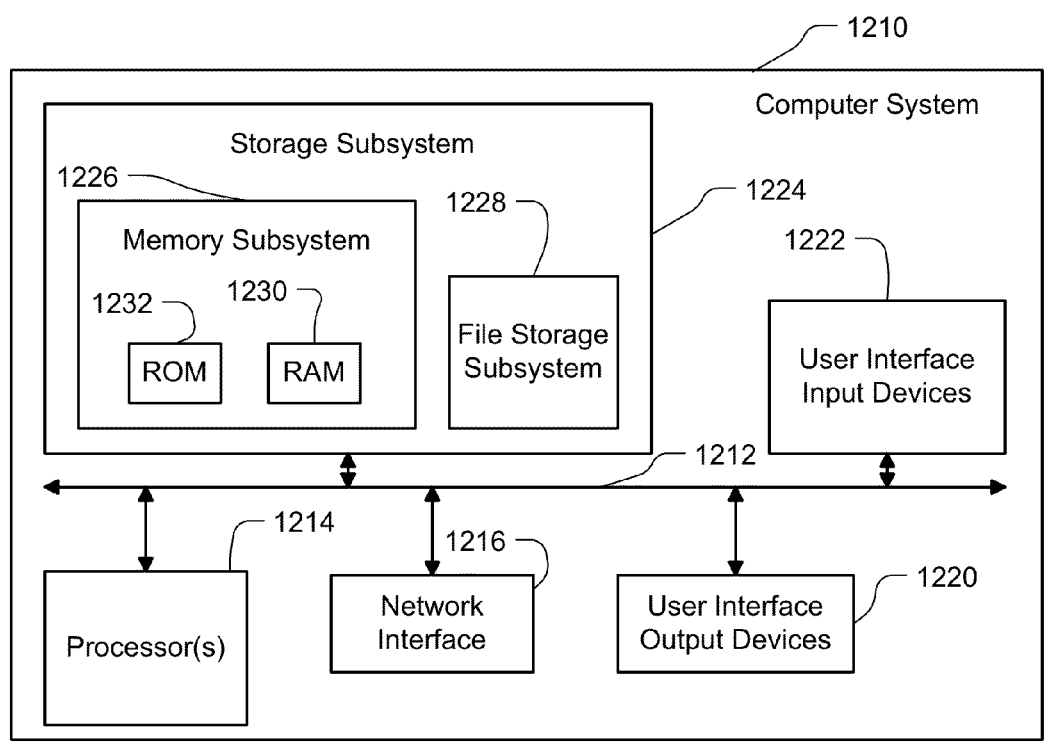
FIG. 12 depicts an example implementation for a device to show promotional content based on the recognized audio.

FIG. 12 depicts an example implementation for a device to show promotional content based on the recognized audio. In this case when the audio that is recognized is unique to a specific campaign, the targeted content is delivered to the device. If the recognized audio is a song, the song information is shown to the user, and then depending on the type of ad in the campaign, the ad is either shown alongside the song information or a full page takeover takes place. If the recognized audio is not unique to a specific campaign, a bidding process takes place. The system can optionally implement an anti-fraud functionality to only count a limited number of recognitions per device per some time period, such as a day.

Computer system 1210 typically includes at least one processor 1214, which communicates with a number of peripheral devices via bus subsystem 1212. These peripheral devices may include a storage subsystem 1224, comprising for example memory devices and a file storage subsystem, user interface input devices 1222, user interface output devices 1220, and a network interface subsystem 1216. The input and output devices allow user interaction with computer system 1210. Network interface subsystem 1216 provides an interface to outside networks, including an interface to communication network 140, and is coupled via communication network 140 to corresponding interface devices in some computer systems.

User interface input devices 1222 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 1210 or onto communication network 140.

User interface output devices 1220 may include a display subsystem, a printer, a fax machine, or non-visual displays such as audio output devices. The display subsystem may include a cathode ray tube (CRT), a flat-panel device such as a liquid crystal display (LCD), a projection device, or some mechanism for creating a visible image. The display subsystem may also provide non-visual display such as via audio output devices. In general, use of the term "output device" is intended to include all possible types of devices and ways to output information from computer system 1210 to the user or to another machine or computer system.

Storage subsystem 1224 stores programming and data constructs that provide the functionality of some or all of the modules described herein, including the logic to create inferred queries for use as query suggestions according to the processes described herein. These software modules are generally executed by processor 1214 alone or in combination with additional processors.

Memory 1226 used in the storage subsystem can include a number of memories including a main random access memory (RAM) 1230 for storage of instructions and data during program execution and a read only memory (ROM) 1232 in which fixed instructions are stored. A file storage subsystem 1228 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 1228 in the storage subsystem 1224, or in additional machines accessible by the processor.

Bus subsystem 1212 provides a mechanism for letting the various components and subsystems of computer system 1210 communicate with each other as intended. Although bus subsystem 1212 is shown schematically as a single bus, some embodiments of the bus subsystem may use multiple busses.

Computer system 1210 can be of varying types including a workstation, server, computing cluster, blade server, server farm, or any other data processing system or computing device. Due to the ever-changing nature of computers and networks, the description of computer system 1210 depicted in FIG. 12 is intended only as a specific example for purposes of illustrating the preferred embodiments. Many configurations of computer system 1210 are possible having more or fewer components than the computer system depicted in FIG. 12.

Some Particular Implementations

In one implementation, a method is described that includes receiving a selection of a target audio reference. It further includes receiving a selection of at least one aggregate experience category to which the target audio reference belongs, and linking the specified aggregate experience category to one or more bids to deliver one or more promotional or informational content items to users of portable devices upon recognition of audio queries originating from the portable devices that match the target audio reference or the additional audio references in the aggregate experience category. At least the specified target audio reference, the linked aggregate experience category, the bids and the promotional or informational content items are stored as a campaign.

This method and other implementations of the technology disclosed can each optionally include one or more of the following features.

The aggregate experience category can be a genre of music. The linking further includes selection of the genre of music to delivery of promotional content responsive to recognition of an audio query that matches any audio reference in the selected genre.

The aggregate experience category can be multiple renditions by multiple artists of a selected song. The linking further includes identifying multiple renditions by multiple artists of the selected song and linking the selected song aggregate experience category to delivery of promotional content responsive to recognition of an audio query that matches any audio reference of the multiple renditions of a particular song.

The aggregate experience category can be all songs by a selected artist. The linking further includes linking the selected artist aggregate experience category to delivery of promotional content responsive to recognition of an audio query that matches any audio reference of the selected artist.

The aggregate experience category can be all songs by similar artists. The linking further includes identifying the similar artists from the target audio reference and linking the selected similar artists aggregate experience category to delivery of promotional content responsive to recognition of an audio query that matches any audio reference of the similar artists.

The aggregate experience category can be all recommended songs. The linking further includes identifying the recommended songs from the target audio reference and linking the recommended songs aggregate experience category to delivery of promotional content responsive to recognition of an audio query that matches any audio reference of the recommended songs.

The aggregate experience category can be a broadcast channel. The linking further includes linking the broadcast channel aggregate experience category to delivery of promotional content responsive to recognition of an audio query that matches live broadcast content from the selected broadcast channel.

Additional examples of aggregate experience categories above can similarly be combined with this method implementation.

The promotional or informational content can be synchronized to lyrics of the target audio reference.

Other implementations may include a system including memory and one or more processors operable to execute instructions, stored in the memory, to perform a method as described above. Yet another implementation may include a non-transitory computer-readable storage medium storing instructions executable by a processor to perform a method as described above.

In another implementation, a method is described that includes recognizing an audio query and categorizing it into at least one aggregate experience category. It further includes combining the aggregate experience category with at least priority information derived from bidding for content delivery to select among promotional or informational content to be delivered to a user experiencing the recognized audio query.

This method and other implementations of the technology disclosed can each optionally include one or more of the following features.

The aggregate experience category can be any of the categories described above. It can be multiple renditions by multiple artists of a selected song. The recognizing further includes categorizing the recognized audio query as one of multiple renditions by multiple artists of the selected song. Similarly, it can be all songs by similar artists. The recognizing further includes categorizing the recognized audio query as performed by one of a group of similar artists to the recognized audio query.

The promotional or informational content can be synchronized to lyrics of the target audio reference.

Other implementations may include a system including memory and one or more processors operable to execute instructions, stored in the memory, to perform a method as described above. Yet another implementation may include a non-transitory computer-readable storage medium storing instructions executable by a processor to perform a method as described above.

In another implementation, a method is described that includes receiving an uploaded target audio reference from a promoter's system. It further includes processing the target audio reference, preparing it to be recognized and linking the uploaded target audio reference to one or more bids by the promoter to deliver one or more promotional or informational content items to users of portable devices upon recognition of audio queries originating from the portable devices that match the uploaded target audio reference. At least the link to the uploaded target audio reference, the bids and the promotional or informational content items are stored as a campaign.

This method and other implementations of the technology disclosed can each optionally include one or more of the following features.

A specification of one or more target user locations can limit delivery of the one or more promotional items based on an origination location of the audio query. The origination location can be where a computing device is located or an origin of audio being experienced. This feature further includes storing the target user locations with the campaign.

The uploaded target audio reference can include a mix of background music and other sounds. With the upload, the method can include receiving a selection of a song corresponding to the background music and a selection of at least one aggregate experience category to which the song and background music belong. The selected aggregate experience category can be stored with the campaign.

Additional examples of aggregate experience categories above can similarly be combined with this method implementation.

The promotional or informational content can be synchronized to lyrics of the target audio reference.

Other implementations may include a system including memory and one or more processors operable to execute instructions, stored in the memory, to perform a method as described above. Yet another implementation may include a non-transitory computer-readable storage medium storing instructions executable by a processor to perform a method as described above.

While the present technology is disclosed by reference to the embodiments and examples detailed above, it is understood that these examples are intended in an illustrative rather than in a limiting sense. Computer-assisted processing is implicated in the described embodiments. Accordingly, the present technologies may be embodied in methods for initializing or executing recognition of non-textual user queries and related information to return, systems including logic and resources to process audio query recognition, systems that take advantage of computer-assisted methods to process audio query recognition, non-transitory, computer-readable storage media impressed with logic to process audio query recognition, data streams impressed with logic to process audio query recognition, or computer-accessible services that carry out computer-assisted methods to process audio query recognition. It is contemplated that modifications and combinations will readily occur to those skilled in the art, which modifications and combinations will be within the spirit of the technology disclosed and the scope of the following claims.

We claim as follows:

1. A method of initializing recognition of non-textual user queries and related information to return, the method including:
   receiving a selection of a target audio reference;
   receiving a selection of at least one aggregate experience category to which the target audio reference belongs;
   linking the selected aggregate experience category to one or more bids to deliver one or more promotional content items to users of portable devices upon recognition of audio queries originating from the portable devices that match the target audio reference or the additional audio references in the aggregate experience category; and
   storing the selected target audio reference, the linked aggregate experience category, the bids and the promotional content items as a campaign.

2. The method of claim 1, wherein the aggregate experience category is a genre of music, further including linking selection of the genre of music to delivery of promotional content responsive to recognition of an audio query that matches any audio reference in the selected genre.

3. The method of claim 1, wherein the aggregate experience category is multiple renditions by multiple artists of a selected song, further including identifying multiple renditions by multiple artists of the selected song and linking the selected song aggregate experience category to delivery of promotional content responsive to recognition of an audio query that matches any audio reference of the multiple renditions a particular song.

4. The method of claim 1, wherein the aggregate experience category is all songs by a selected artist, further including linking the selected artist aggregate experience category to delivery of promotional content responsive to recognition of an audio query that matches any audio reference of the selected artist.

5. The method of claim 1, wherein the aggregate experience category is all songs by similar artists, further including identifying the similar artists from the target audio reference and linking the selected similar artists aggregate experience category to delivery of promotional content responsive to recognition of an audio query that matches any audio reference of the similar artists.

6. The method of claim 1, wherein the aggregate experience category is all recommended songs, further including identifying the recommended songs from the target audio reference and linking the recommended songs aggregate experience category to delivery of promotional content responsive to recognition of an audio query that matches any audio reference of the recommended songs.

7. The method of claim 1, wherein the aggregate experience category is a broadcast channel, further including linking the broadcast channel aggregate experience category to delivery of promotional content responsive to recognition of an audio query that matches live broadcast content from the selected broadcast channel.

8. The method of claim 1, wherein the promotional content is synchronized to lyrics of the target audio reference.

9. A system including memory and one or more processors configured to execute instructions, stored in the memory, to:
   receive a selection of a target audio reference;
   receive a selection of at least one aggregate experience category to which the target audio reference belongs;
   link the selected aggregate experience category to one or more bids to deliver one or more promotional content items to users of portable devices upon recognition of audio queries originating from the portable devices that match the target audio reference or the additional audio references in the aggregate experience category; and
   store the selected target audio reference, the linked aggregate experience category, the bids and the promotional content items as a campaign.

10. A non-transitory computer readable storage medium storing computer instructions executable by a processor, including instructions to:
    receive a selection of a target audio reference;
    receive a selection of at least one aggregate experience category to which the target audio reference belongs;
    link the selected aggregate experience category to one or more bids to deliver one or more promotional content items to users of portable devices upon recognition of audio queries originating from the portable devices that match the target audio reference or the additional audio references in the aggregate experience category; and
    store the selected target audio reference, the linked aggregate experience category, the bids and the promotional content items as a campaign.

11. A method of initializing recognition of non-textual user queries and related information to return, the method including:
    recognizing an audio query and categorizing it into at least one aggregate experience category;

combining the aggregate experience category with at least priority information derived from bidding for content delivery;

selecting among promotional content; and delivering the selected promotional content to a user experiencing the recognized audio query.

12. The method of claim 11, wherein the aggregate experience category is multiple renditions by multiple artists of a selected song, further including recognizing the audio query and categorizing it as one of multiple renditions by multiple artists of the selected song.

13. The method of claim 11, wherein the aggregate experience category is all songs by similar artists, further including recognizing the audio query and categorizing it as performed by one of a group of similar artists to the recognized audio query.

14. The method of claim 11, wherein the promotional content is synchronized to lyrics of the target audio reference.

15. A system including memory and one or more processors configured to execute instructions, stored in the memory, to:

recognize an audio query and categorize it into at least one aggregate experience category;

combine the aggregate experience category with at least priority information derived from bidding for content delivery to select among promotional content to be delivered to a user experiencing the recognized audio query.

16. A non-transitory computer readable storage medium storing computer instructions executable by a processor, including instructions to:

recognize an audio query and categorize it into at least one aggregate experience category;

combine the aggregate experience category with at least priority information derived from bidding for content delivery to select among promotional content to be delivered to a user experiencing the recognized audio query.

17. A method of initializing recognition of non-textual user queries and related information to return, the method including:

receiving an uploaded target audio reference from a promoter's system;

processing the target audio reference and preparing it to be recognized;

linking the uploaded target audio reference to one or more bids by the promoter to deliver one or more promotional content items to users of portable devices upon recognition of audio queries originating from the portable devices that match the uploaded target audio reference;

storing at least the link to the uploaded target audio reference, the bids and the promotional content items as a campaign; and receiving a specification of one or more target user locations that limit delivery of the one or more promotional items and storing the target user locations with the campaign.

18. The method of claim 17, wherein the uploaded target audio reference includes a mix of background music and other sounds, further including:

receiving a selection of a song corresponding the background music and a selection of at least one aggregate experience category to which the song and background music belong; and storing the selected aggregate experience category with the campaign.

19. The method of claim 17, wherein the promotional content is synchronized to lyrics of the target audio reference.

20. A system including memory and one or more processors configured to execute instructions, stored in the memory, to:

receive an uploaded target audio reference from a promoter's system;

process the target audio reference and prepare it to be recognized;

link the uploaded target audio reference to one or more bids by the promoter to deliver one or more promotional content items to users of portable devices upon recognition of audio queries originating from the portable devices that match the uploaded target audio reference;

store at least the link to the uploaded target audio reference, the bids and the promotional content items as a campaign; and receive a specification of one or more target user locations that limit delivery of the one or more promotional items and storing the target user locations with the campaign.

21. A non-transitory computer readable storage medium storing computer instructions executable by a processor, including instructions to:

receive an uploaded target audio reference from a promoter's system;

process the target audio reference and prepare it to be recognized;

link the uploaded target audio reference to one or more bids by the promoter to deliver one or more promotional content items to users of portable devices upon recognition of audio queries originating from the portable devices that match the uploaded target audio reference;

store at least the link to the uploaded target audio reference, the bids and the promotional content items as a campaign; and receive a specification of one or more target user locations that limit delivery of the one or more promotional items and storing the target user locations with the campaign.

* * * * *

UNITED STATES PATENT AND TRADEMARK OFFICE
CERTIFICATE OF CORRECTION

| | | |
|---|---|---|
| PATENT NO. | : 9,035,163 B1 | Page 1 of 1 |
| APPLICATION NO. | : 13/468975 | |
| DATED | : May 19, 2015 | |
| INVENTOR(S) | : Keyvan Mohajer et al. | |

It is certified that error appears in the above-identified patent and that said Letters Patent is hereby corrected as shown below:

On The Title Page, Item (73) Assignee, delete "Soundbound, Inc." and insert -- SoundHound, Inc. --.

Signed and Sealed this
Fifteenth Day of December, 2015

Michelle K. Lee
*Director of the United States Patent and Trademark Office*